(12) United States Patent
Posa

(10) Patent No.: US 11,303,790 B1
(45) Date of Patent: *Apr. 12, 2022

(54) ELECTRONIC BINOCULAR MODULES ADAPTED FOR ATTACHMENT TO SMARTPHONES AND CASES THEREFOR

(71) Applicant: John G. Posa, Ann Arbor, MI (US)

(72) Inventor: John G. Posa, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,197

(22) Filed: Sep. 4, 2021

Related U.S. Application Data

(63) Continuation-in-part of application No. 17/120,141, filed on Dec. 12, 2020, now Pat. No. 11,115,512.

(60) Provisional application No. 63/159,046, filed on Mar. 10, 2021.

(51) Int. Cl.
*H04N 5/225* (2006.01)
*H04N 13/239* (2018.01)
*H04N 5/232* (2006.01)
*H04M 1/02* (2006.01)
*G02B 23/12* (2006.01)
*G02B 23/18* (2006.01)
*G01S 17/08* (2006.01)

(52) U.S. Cl.
CPC ......... *H04N 5/2257* (2013.01); *G02B 23/12* (2013.01); *G02B 23/18* (2013.01); *H04M 1/0264* (2013.01); *H04N 5/23293* (2013.01); *H04N 5/23296* (2013.01); *H04N 13/239* (2018.05); *G01S 17/08* (2013.01)

(58) Field of Classification Search
None
See application file for complete search history.

(56) References Cited

U.S. PATENT DOCUMENTS

| | | | |
|---|---|---|---|
| 11,115,512 B1* | 9/2021 | Posa | H04M 1/0264 |
| 2021/0152682 A1* | 5/2021 | Ishii | H04M 1/0262 |
| 2021/0165467 A1* | 6/2021 | Tseng | H04M 1/0264 |
| 2021/0195005 A1* | 6/2021 | Li | H04N 5/2257 |
| 2021/0195006 A1* | 6/2021 | Li | H04M 1/0256 |
| 2021/0314429 A1* | 10/2021 | Huang | G06F 1/1632 |

* cited by examiner

*Primary Examiner* — David N Werner
(74) *Attorney, Agent, or Firm* — The Law Offices of John G. Posa

(57) ABSTRACT

Hand-held devices combine smartphones and electronic binoculars. In "in-phone" embodiments, binocular functionality is integrated directly into the housing or body of a smartphone modified in accordance with the invention. In "in-case" embodiments, the binoculars are integrated into a case to receive a smartphone which may be of conventional design. In "in-module" embodiments, electronic binoculars are integrated into a separate housing adapted for attachment to a phone or case. In all embodiments, components within the phone may be used for image manipulation, image storage, and/or sending and receiving/streaming stereoscopic/3D/live/video motion imagery. The imagery gathering devices may be supported on or in one of the longer side edges of the phone or case, whereas the display magnifying eyepieces are preferably associated with the opposing longer side edge of the phone or case. As such, in use, a user holds the phone or case in a generally horizontal plane during use as binoculars.

19 Claims, 15 Drawing Sheets

ELECTRONIC BINOCULAR MODULES ADAPTED FOR ATTACHMENT TO SMARTPHONES AND CASES THEREFOR

REFERENCE OF RELATED APPLICATIONS

This application is a continuation-in-part of U.S. patent application Ser. No. 17/120,141, filed Dec. 12, 2020, now U.S. Pat. No. 11,115,512, which claims priority to, and the benefit of, U.S. Provisional Patent Application Ser. No. 63/159,046, filed Mar. 10, 2021, the entire content of all Related Applications being incorporated herein by reference.

FIELD OF THE INVENTION

This invention relates generally to digital and electronic binoculars and, in particular, to compact digital and electronic binoculars combined with smartphones.

BACKGROUND OF THE INVENTION

Cellular phones with integrated functionality—i.e., smartphones—have become the standard platform for a wide variety of hardware and software features, including cameras, GPS, flashlights, calculators, as well as application software or 'apps' for email, maps, games, social media and numerous other capabilities.

There have been attempts to convert smartphones into binoculars, but existing approaches use the touch-screen display of the phone for viewing through an attached magnifier, resulting in a non-optimal solution. There remains an outstanding desire for additional smartphone-related enhancements, including more elegant, capable and easy-to-use smartphone-binocular integrations.

SUMMARY OF THE INVENTION

In broad and general terms, this invention combines smartphones with binoculars, enabling the user to conveniently carry and use binocular functionality by simply reaching for their phone. In some embodiments (the "in-phone" embodiments), the binoculars are integrated directly into a smartphone. In alternative embodiments (the "in-case" embodiments), the binoculars are integrated into a case to receive an existing smartphone, or (the "in-module embodiments), the binoculars assume the form of a module attachable to a smartphone or a case.

In the in-phone embodiments, the binoculars gain functionality from processing, memory and/or communications components within the phone for image manipulation, image storage, and/or sending and receiving stereoscopic/3D imagery. In the in-case and in-module embodiments, the binoculars may function entirely independently of the smartphone. However, more preferably, a wired or wireless connection is made between the binoculars and the smartphone, thereby enabling the binoculars to take advantage of smartphone features and functions as well. In all embodiments, a user may adjust focus, zoom, image capture, and other features using the touch-screen display of the smartphone.

In all embodiments, the binoculars are electronic binoculars in the sense that although some optical components are used, the binoculars take advantage of electronic image sensors and displays. The objective lenses for the binoculars are preferably supported on or in one of the longer side edges of the phone or case, whereas the display magnifying eyepieces are preferably associated with the opposing longer side edge of the phone or case. As such, in use, a user holds the phone or case in a generally horizontal plane, preferably with the front, touch-screen display surface of the phone facing upwardly. In preferred embodiments this enables the user to use the touch screen of the phone for binocular-related controls such as focusing, zoom, image capture, and so forth.

A pair of spaced-apart, right and left imagery-gathering devices are disposed on a first surface of the phone, case or module, and a pair of spaced-apart right and left image-displaying devices are disposed on an opposing surface of the phone, case or module. Right and left image sensors convert the imagery gathered by the right and left image-gathering devices into electrical signals representative of the right and left imagery, respectively. Electronic circuitry receives the electrical signals from the right and left image sensors and simultaneously displays the imagery on the right and left image-displaying devices, thus providing electronic binocular functionality.

While the invention may be used to gather, store, send and receive still imagery, in the preferred embodiments, the imagery gathered and displayed is real-time motion imagery, which may comprise video imagery at standard or proprietary frame rates (i.e., 15, 24, 30, 60, 120, 240 fps or higher); scan modality (i.e., progressive, etc.); and/or aspect ratio (i.e., round, square, 4:3, 16:9, HD, theatre, widescreen, ultra widescreen, etc.)

The right and left image-gathering devices may include objective optics, and the objective optics may project the imagery directly onto right and left image sensors immediately adjacent the objective optics. Alternatively, the right and left image sensors may be spaced apart from the right and left image-gathering devices to increase focal length, and/or one or more optical components may be disposed between the right and left objective optics and the right and left image sensors to perform optical focusing or optical zoom functions.

In in-case/module embodiments, an interface may be provided enabling the electronic circuitry of the case or module to communicate with the smartphone and utilize the processor, memory, communications and any other applicable capabilities of the smartphone to manipulate, store or transmit the imagery, or receive imagery from an external source for display on the viewfinders.

Preferred embodiments of the invention may further include apparatus for adjusting interpupillary distance; apparatus for determining when the binoculars are oriented to provide an instant-on function; apparatus for stabilizing the imagery; apparatus for interpolating the imagery; apparatus for zooming the imagery in and out under user control; and/or LIDAR operative to assist with focusing the imagery or provide range-finding functions. In some embodiments, the image sensors may operate in the infrared (IR) portion of the electromagnetic spectrum enabling the binoculars to perform a night vision function, either automatically or in response to user control.

While larger and smaller diagonal sizes may be used, the right and left image-displaying devices are preferably microdisplays with diagonal measurements of 0.5 inches or less, with one or more optical components being used to magnify the microdisplays. The right and left image sensors may be separate solid-state devices, or the right and left image sensors use different regions of the same solid-state device.

DETAILED DESCRIPTION OF THE PREFERRED EMBODIMENTS

Figure 1:
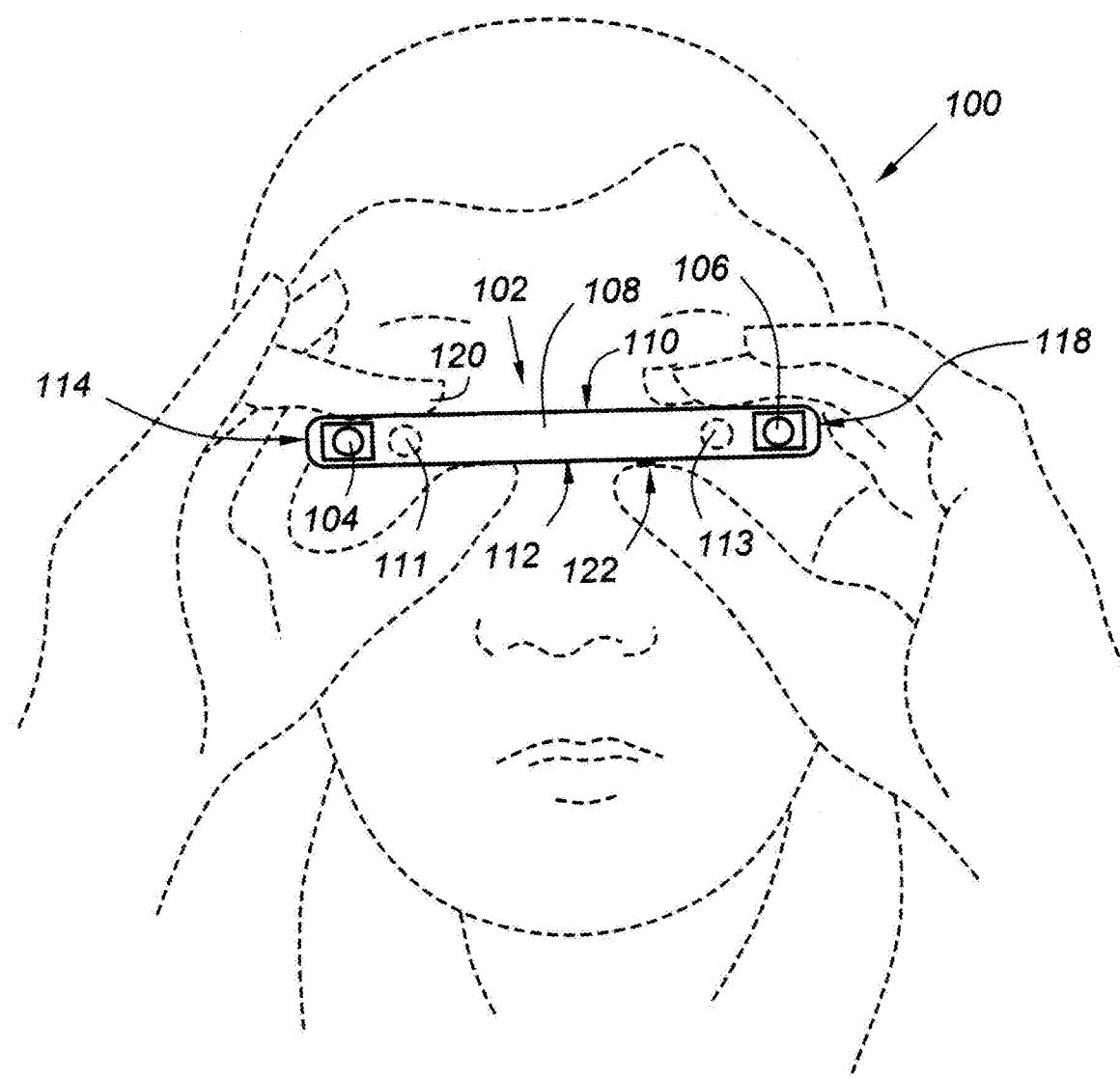
FIG. 1 is a simplified, introductory drawing that illustrates the way in which the invention may be used.

FIG. 1 is a simplified, introductory drawing that illustrates the way in which the invention is typically used. In this drawing, device 102 may represent either an "in-phone" embodiment of the invention, wherein binoculars are integrated directly into the body of a smartphone; an "in-case" embodiment of the invention, wherein binoculars are integrated into a case for a smartphone; or an "in-module" embodiment, wherein binoculars are integrated into a module adapted for attachment to a phone or case. The "in-module" embodiment, described in detail further below, will ordinarily be thicker than the device depicted in FIG. 1. Further, "smartphone" should be taken to include any handheld portable communications device from any manufacturer, including cellphones, that include additional capabilities that may or may not be related to telecommunications.

Returning to FIG. 1, a user 100 typically holds the device 102 in a horizontal plane, with a first edge surface 108 facing outwardly. Edge surface 108 contains two imagery-gathering objectives 104, 106. Note that as used herein, "objective" should be broadly interpreted to mean two areas or regions associated with gathering right and left images of a remote scene or subject matter. Thus, depending upon the implemented embodiment, objectives 104, 106 may be lenses or other optical components such as mirrors, or even apertures or ports in optical communication with lenses or other optical components within the body of the device.

An opposing side edge surface 109, not visible in this view, faces the user. This edge surface includes two corresponding oculars or eyepieces 111, 113 which user 100 views. Optics in the oculars or eyepieces perform display magnification. In all embodiments, electronic or mechanical devices may be provided for diopter adjustment to match prescription eyewear, and/or to accommodate interpupillary adjustment as described with reference to FIG. 4.

Additionally, "lens" or "optics" should be taken to include one or more optical elements capable of providing required or desired image-forming or transmission functions. Those of skill in optics will appreciate that multiple lenses or groups may be used to enhance image quality, and that the total number of lenses may be reduced through the use of aspherical surfaces. The lenses may be plastic or glass, and anti-reflection coated surfaces are preferably used. The invention is not limited in terms of the optical design, and any possible magnification or zoom range may be implemented.

Touch-screen surface 110 of the smartphone typically faces upwardly during use to better enable a user to control operation, including binocular functioning when the binoculars use smartphone functionality. For example, the user may slide a fingertip 120 on the touchscreen surface to control focus, zoom and/or other functions during binocular use. Physical and other touch controls may also be provided on other surfaces of the device, For example, a physical button may be provided to record an image, and/or touch controls may be provided on the bottom surface 112, in which case a user's thumb(s) may be used. References 114, 118 represent the top and bottom edge surfaces of the device which, again, may or may not include binocular-related controls.

Figure 2A:
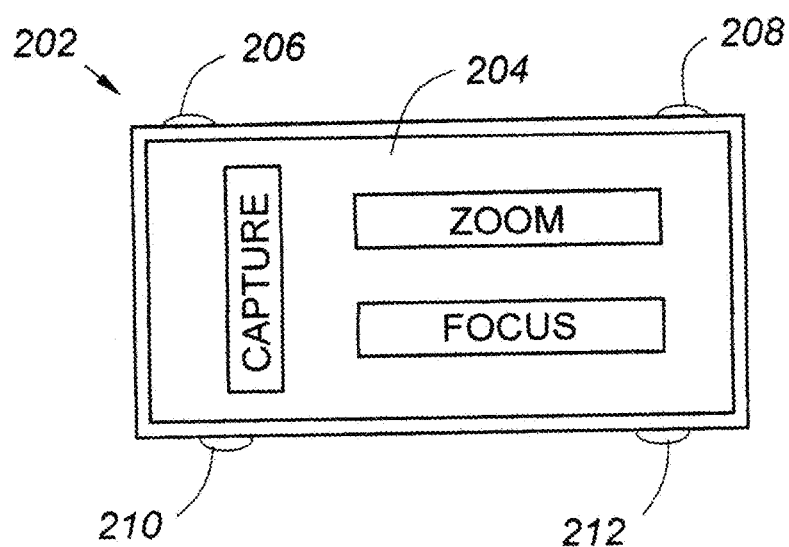
FIG. 2A is a top-down view of an in-phone embodiment of the invention, showing how the touch-screen of the phone may provide binocular-related user controls.

FIG. 2A is a top-down view of an in-phone embodiment of the invention, assuming a user is holding the device in accordance with the orientation depicted in FIG. 1. In this version of the invention, the objectives 206, 208 and oculars 210, 212 are integrated into the body of the phone 202. Image processing and other functions also use devices internal to the phone, which may include the phone's primary central processing unit (CPU), electronic components dedicated to operation of the binoculars and battery power. During use of the smartphone as binoculars, touch-screen display 204 may provide binocular controls for focus, zoom, image capture/recall or other functions. Such display regions may be implemented as slider bars or touch areas. The various controls may include multiple modes of operation; for example, a first touch of the capture button may initiate real-time stereoscopic motion capture, whereas a second touch may terminate the capture. Holding down a button may continue to advance a function until the finger is lifted, and so forth.

Figure 2B:
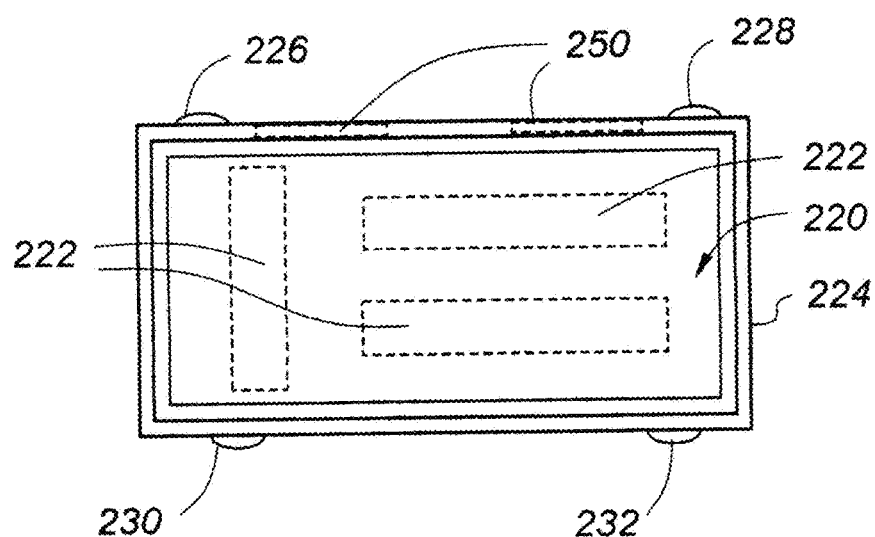
FIG. 2B is a top-down view of an in-case embodiment of the invention, showing how binocular-related user controls may be provided on/in the case and/or the touch-screen of the phone.

FIG. 2B is a top-down view of an in-case embodiment of the invention, also assuming a user is holding the device in accordance with the orientation depicted in FIG. 1. In this embodiment the case 224 includes a cavity or other region configured to receive a phone 220, which may be of conventional design, regardless of manufacturer. The appearance and use of the device is very similar to the in-phone embodiment of FIG. 2A, except that objectives 226, 228 and eyepieces 230, 232 are disposed on/in case 224. The display of the phone forms one of the surfaces of the overall housing of the device surrounded by the outer edge surfaces.

In the in-case (and in-module) embodiments of the invention, the binoculars may function entirely independently of phone 220, including necessary electronics and battery being disposed within the case/module as well. Preferably, however, the in-case/module binoculars communicate with phone 220 through a physical and/or wireless connection, thereby enabling a user to make use of processor(s) or memory in the phone for added functionality, including the provision of on-screen controls 240 for focus, zoom, image capture or other binocular-related functions as with the in-phone embodiments. If the in-case/module embodiment is not in communication with the phone, binocular-related controls 250 for functions such as focusing, zoom and image capture/recall would be provided on the case or module, as the case may be.

As a further alternative, voice commands may be used in all embodiments, such as ZOOM IN, ZOOM OUT, STOP and CAPTURE (or RECORD, STORE, etc.). Since the phone may already knows that it is in "binocular mode," there should be no need to preface the voice commands with an introductory utterance. More advanced commands such as FOCUS RIGHT (eye); FOCUS LEFT (eye); FOCUS BOTH (eyes); (show) DISTANCE; IDENTIFY (subject matter); IR (infrared) are also possible.

For the sake of convenience, in all embodiments, the device may sense when a user places the edge with the eyepieces proximate to a user's face, in which case the device may automatically enter into the binocular mode. This would save time when a user wants to view fleeting subject matter. Such sensing may be thermal, as with an IR sensor between the eyepieces, or optically, with the eyepieces themselves sensing the eyes of a user. For reasons of privacy, automatic entry into binocular mode may be carried out independently of phone-related functions, which may require further authentication.

Figure 3A:
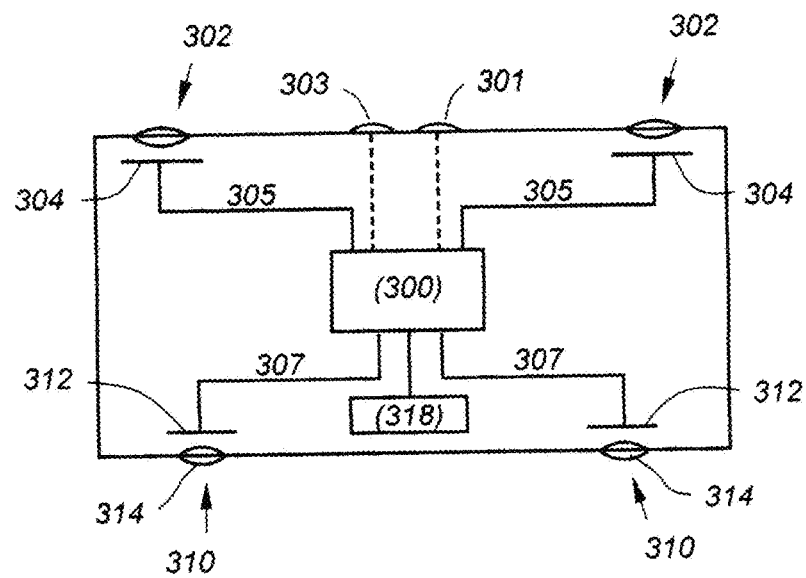
FIG. 3A is a simplified block diagram illustrating one possible optical path layout applicable to both in-phone and in-case embodiments, wherein right and left image sensors deliver electrical signals to a processor, and wherein the processor delivers corresponding signals to right and left viewfinder displays.

FIGS. 3A-3D depict different possible optical path layouts applicable to all embodiments, except that processor 300 could be in the phone, case or module. In the embodiment of FIG. 3A, objectives 302 form images onto respective image sensors 304 which deliver electrical signals to processor 300 along lines 305. User controls are depicted schematically at 318. "Objectives" should be taken to include any optical components such as lenses, groups of lenses, including compound, aspheric, etc. used to image formation. Image sensors are preferably state-of-the-art solid-state CCD or, more preferably low-power, high-resolution CMOS devices. The invention is not limited in terms of image sensor (or display) technology.

In FIG. 3A, it is assumed that magnification and/or zoom are digital in the sense that there are no moving parts. In this case, a portion of the image on sensors 304, are electronically expanded prior to presentation to the user, resulting in magnified images. Interpolation or other enhancement techniques known in the art may be used to improve image quality. Note also that image sensors 304 may operate beyond the visible region of the spectrum, into the infrared, for example, such that the device may be used for binocular night vision. The user may enter into a night vision mode in which case sensor sensitivity and/or image processing may be optimized for low-light conditions, and an optional infrared illuminator 301 may be used to illuminate a scene outside of the visible range.

All embodiments may further include the use of a LIDAR (light detection and ranging) sensor(s) (i.e., 303) for improved focusing, 3D visualization or other advantages including range finding for distance measurement. Scanning or array-type LIDAR technologies may be used; for example, the latter may be implemented with an array of vertical cavity surface-emitting lasers (VCSELs), with the return flash(es) being detected by an array of single-photon avalanche diodes (SPADs) or other devices.

Continuing the reference to FIG. 3A, electrical signals representative of the stereoscopic images captures by the objectives 302, 304 are delivered along paths 307 to eyepieces 310. Eyepieces 310 include left and right microdisplays 312 and any appropriate magnification components such as lenses 314. As with the objectives, lenses 314 should be taken to include compound, aspheric, Fresnel variations.

Fortunately, microdisplay technology is advancing to the point where small near-to-eye (NED) devices are useful to the invention. Microdisplays can be made from a range of display technologies, including liquid-crystal (LCD), LCD on silicon (LCoS) and others. In the preferred embodiments, MicroLED (light-emitting diode) or organic LED (OLED) microdisplays would be used. In time, holographic microdisplays may also be implemented.

In all embodiments autofocus, manual focus, or a combination of auto and manual may be used. Any known autofocus technologies may be implemented, including contrast-based, phase-based, dual-pixel or time-of-flight/laser-based (i.e., with a LIDAR sensor). While tracking a moving target may be challenging for some autofocus technologies, advanced techniques are achieving very fast autofocusing capabilities. As one example, Sony Corp. is now combing contrast and phase-based techniques to achieve autofocus speeds of 0.02 seconds, and it is anticipated that this value will decrease over time. In the even the binoculars are unable to keep up with movement, the system may 'lock in' focus until relative movement becomes more manageable.

Figure 3B:
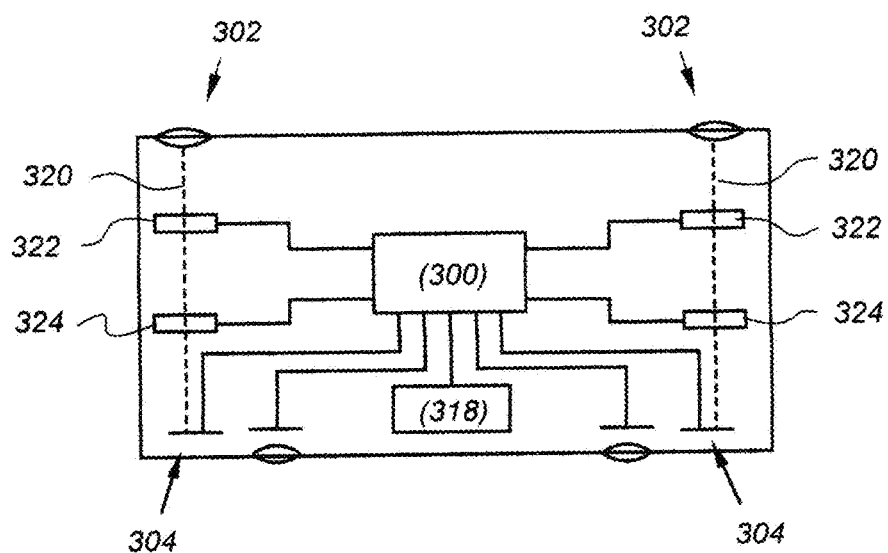
FIG. 3B is a simplified block diagram showing an alternative optical paths wherein, to improve telephoto operation, image sensors may be arranged at a distance from objectives.

To improve telephoto operation, image sensors 304 may be arranged at a distance from objectives 302 along optical paths 320, as shown in FIG. 3B. This not only facilitates inherently longer focal lengths, it allows for optical zoom, or a combination of optical and digital zoom, as well as additional focusing techniques. In FIG. 3B, optical zoom components and focusing components are illustrated at 322 and 324, respectively, under control of processor 300 and/or settings of user control(s) 318. Each optic 322, 324 may incorporate a plurality of lenses, including at least one focusing lens and at least one zoom lens having a variable focal length.

Figure 3C:
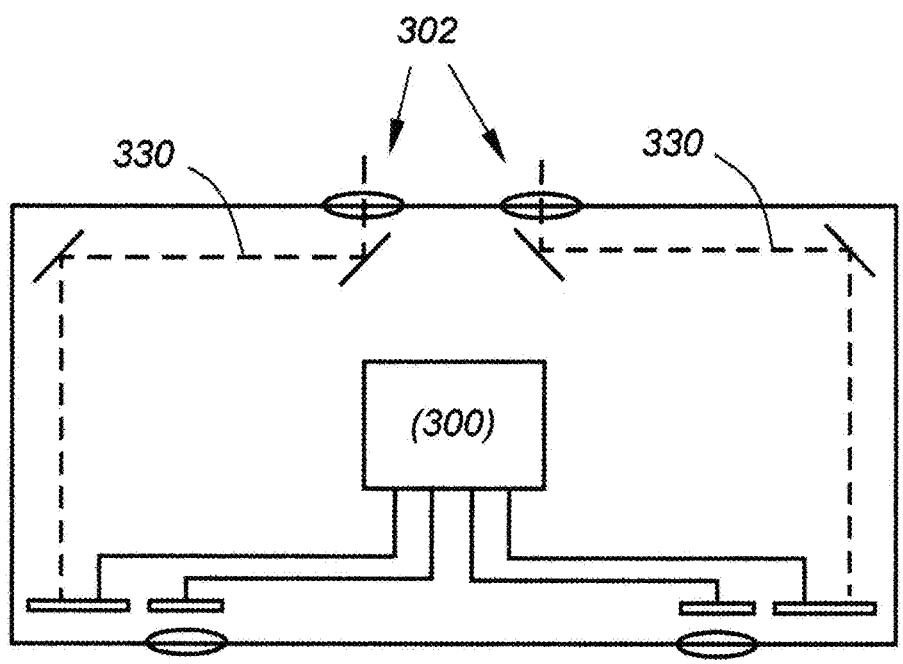
FIG. 3C is a simplified block diagram showing how mirrors or other beam-redirecting optical devices such as prisms may be used to further increase optical focal length.
Figure 3D:
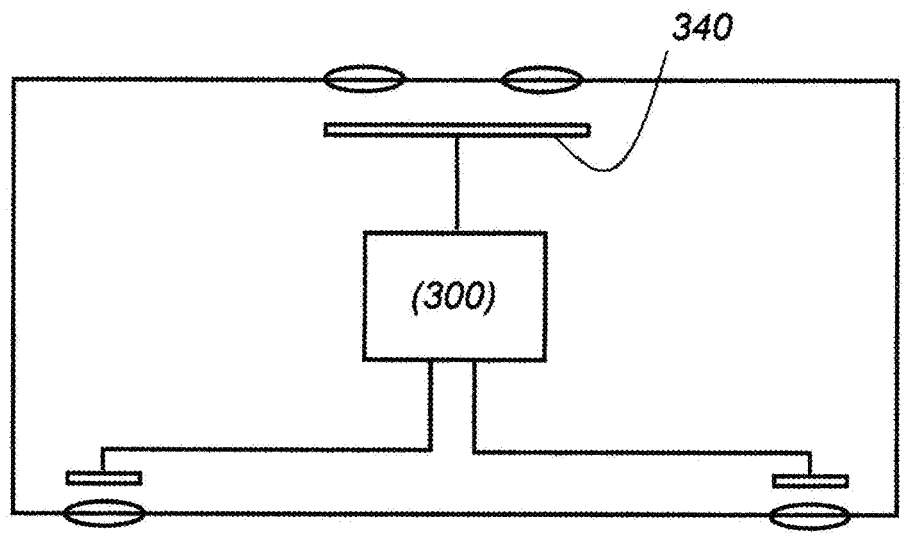
FIG. 3D illustrates the way in which a single image sensor may be shared; that is, with one portion of the sensor being used for the right image and another portion of the sensor being used for the left.

To even further expand optical focal length, mirrors or other beam-redirecting optical devices such as prisms may be used. As one example, FIG. 3C shows the use of mirrors and objectives that are closer together. Optical components for zoom, focus, and so forth may also be supported in paths 330. As shown in FIG. 3D, particularly if objectives are placed closer together, a single image sensor 340 may be shared; that is, with one portion of the sensor being used for the right image and another portion of the sensor being used for the left.

Figure 4A:
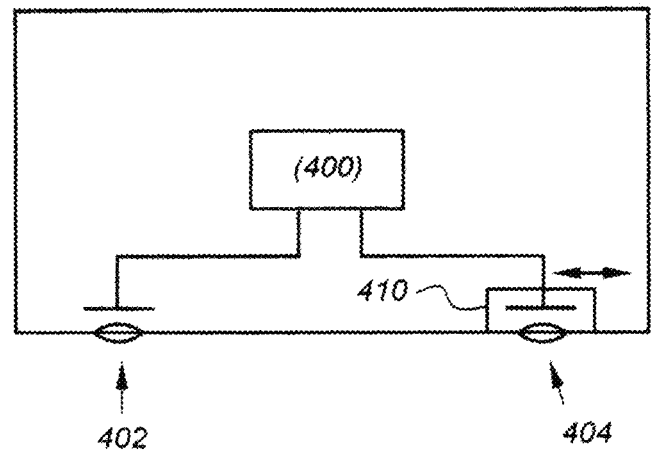
FIG. 4A illustrates a manual interpupillary adjustment technique wherein at least one of the eyepieces is fixed, and at least the other eyepiece slides laterally.

As mentioned, the invention anticipates the need for interpupillary adjustment. This may be accomplished manually or electronically with no moving parts. FIG. 4A illustrates a manual technique wherein at least one of the eyepieces 402 is fixed, whereas at least the other eyepiece 404 slides from right to left. Thus, the ocular and microdisplay for one eye would be contained in a translatable compartment 410, enabling the distance between the eyepieces or viewfinders to be adjusted from 55 to 65 mm, more or less.

Figure 4B:
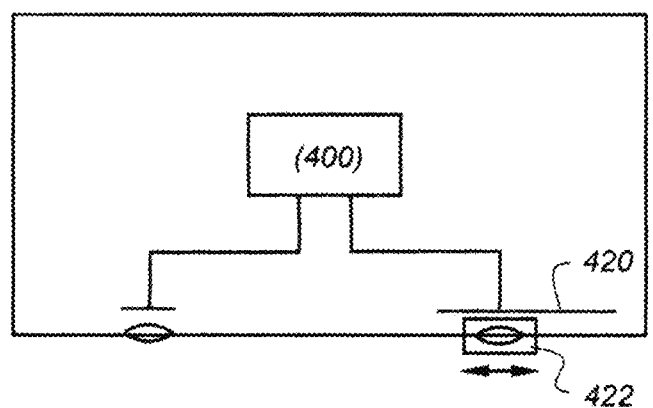
FIG. 4B illustrates an alternative, semi-manual arrangement interpupillary adjustment technique wherein an elongated microdisplay is used in conjunction with a moveable lens.

FIG. 4B illustrates a semi-manual arrangement wherein an elongated microdisplay 420 is used in conjunction with a moveable lens 422. In this implementation, the side-to-side movement of lens (or lens assembly) would be sensed, causing a corresponding shifting of the image on the display 420 to coincide with position of the lens.

Figure 4C:
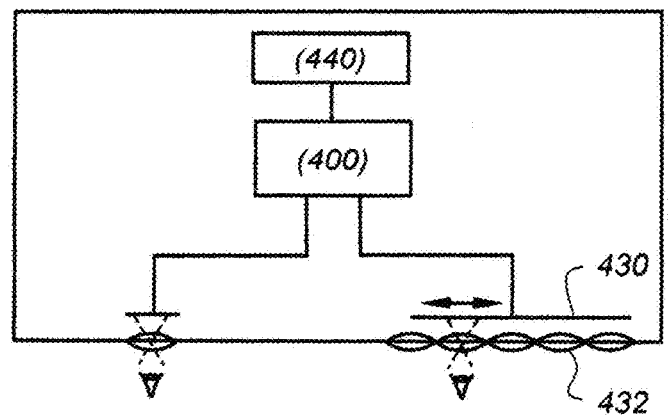
FIG. 4C shows an interpupillary distance adjustment technique that requires no moving parts, wherein an elongated microdisplay is used in conjunction with an elongated array of lens elements.

FIG. 4C shows an interpupillary distance adjustment technique that requires no moving parts. In this case, an elongated microdisplay 430 is used in conjunction with an elongated array of lens elements 432. To adjust interpupillary distance, a user control 440 interfaced to processor 400 is used to shift the position of the image on the display from left to right until it corresponds to the lens in array 432 determined to be most comfortable to the user.

Figure 5:
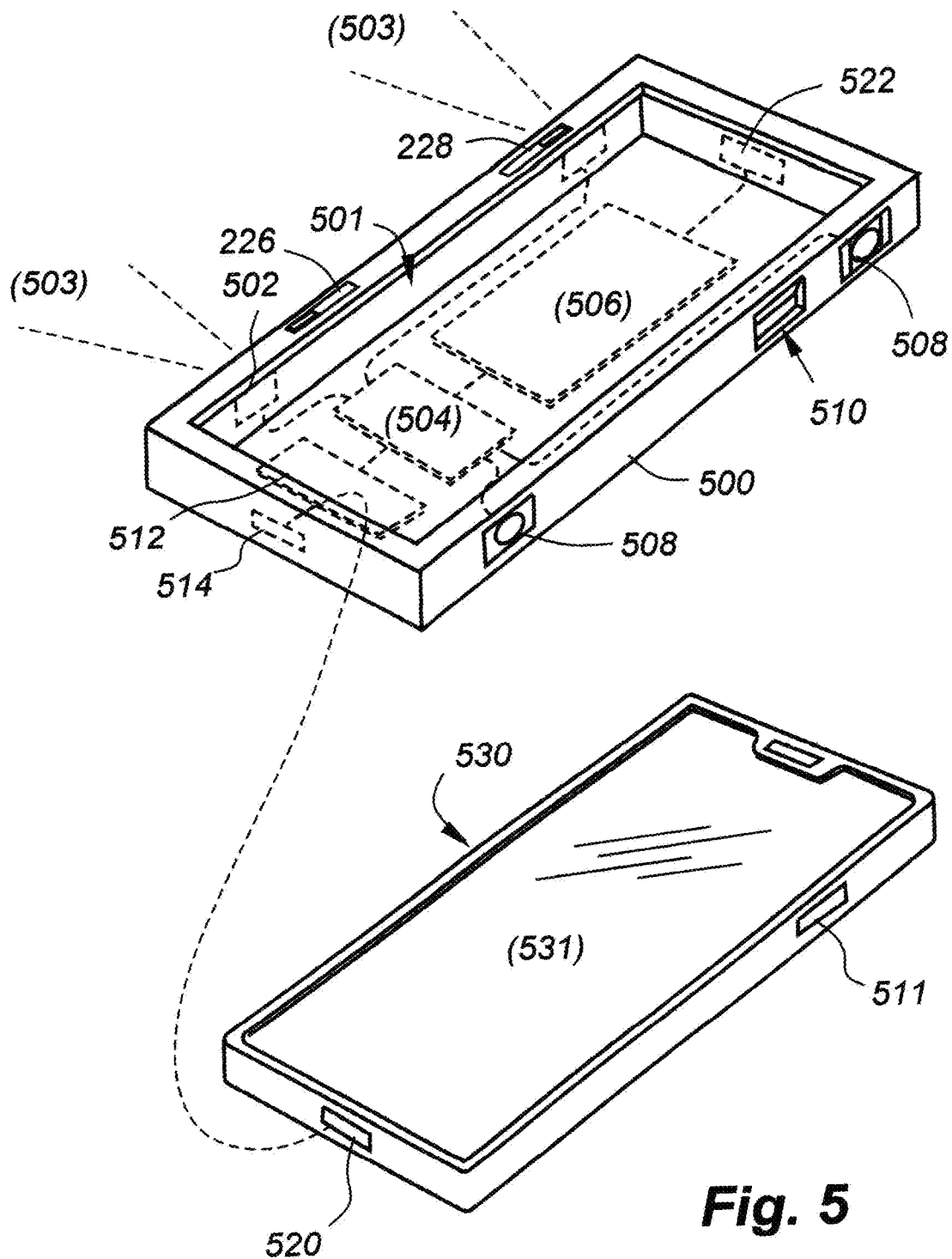
FIG. 5 is a perspective view of an in-case embodiment of the invention including a block diagram showing important electronic components.

FIG. 5 is a perspective view of an in-case embodiment of the invention and a smartphone configured for coupling to the case. The case, 500, includes a structure adapted to receive a smartphone in housing 530. In one preferred embodiment, the structure includes a cavity 501 physically dimensioned to receive a smartphone of conventional design, such that when received, the touch-screen display 531 of the phone forms the upper surface of a generally rectangular hand-held device.

The various features that comprise the binoculars are preferably molded into the case material, which also acts to cushion the phone. The image sensors/objectives, shown at 502, having fields of view 503, and eyepieces/oculars 508, make respective interconnections to an electronic processing module 504, which may be integrated into the bottom or back surface of the case, along with rechargeable battery 506. One or both of the eyepieces/oculars 508 may include any of the interpupillary adjustment capabilities disclosed herein. The case 500 may include one or more cut-outs or moveable panels 510 enabling a user to manipulate controls such as on the phone when received by the case. It is anticipated that different in-case versions of the invention may be designed to accommodate phones from different manufacturers.

Electronics module 504 may perform basic image processing functions such as brightness, focus, zoom, and so forth, with no complex image manipulation, storage or communications. However, more sophisticated stand-alone in-case embodiments may include optical zoom, LIDAR and/or night vision, as well as graphics processing for image interpolation or stabilization, a memory for image storage and recall, and independent wired or wireless communications capabilities for image sharing and downloading for stereoscopic viewing. Stand-alone in-case embodiments would also provide binocular-related controls 226, 228 on the case 500, which may be touch controls, mechanical sliders, dials, buttons, etc., making respective connections to the processor 504 through the broken lines indicated.

While stand-alone, in-case or in-module embodiments of the invention need not communicate with the phone, one or more communications interface(s) are preferably provided to facilitate communication with the smartphone, to take advantage of the components and functionality provided by the smartphone. A connector 514 may be provided on an inner surface of the case to receive a corresponding connector 520 of the phone when received by case (or module) 500. As is common, phone connector 520 may also be used to recharge the phone's battery. Connector 514 may also be used for recharging in-case battery 506, thereby obviating the need for connector 522.

As opposed to a hardwired connection making a direct, physical connection to the phone, the interface between the case and the phone may be wireless, using wireless communication circuitry in module 512, which may be integrated into or separate from processor module 504. Any suitable wireless interface may be used, including Bluetooth, WiFi, near-field communications (NFC) or any known or yet-to-be developed communications protocol.

Whether physical, wired, optical or wireless, the advantages of providing an interface to the smartphone are many, including the use of the phone's processor for advanced image processing functions, including image stabilization, interpolation, etc.; use of the phone memory for image storage and recall; and use of the phone's cellular and/or WiFi interfaces for image sharing, posting on Internet web sites, live streaming of stereoscopic/3D images/video, and so forth. Further, and importantly, the phone communication interface facilitates the use of the phone's touch screen for binocular control functions, as shown in FIG. 2B.

Particularly if image storage/recall and/or higher-speed communications interfaces are provided, the viewfinders may alternatively be used to watch stereoscopic imagery derived from other internal or external sources such as 3D movies, virtual reality (VR) animation, augmented reality (AR), and so forth, from memory or streaming sources. As one example of the possibilities made possible by the invention, a user may capture and stream a live stereoscopic feed to any number of remote users also equipped with the invention, thereby enabling such remote users to watch the "same" sports or musical event, bird/wildlife, or other scene.

Figure 6:
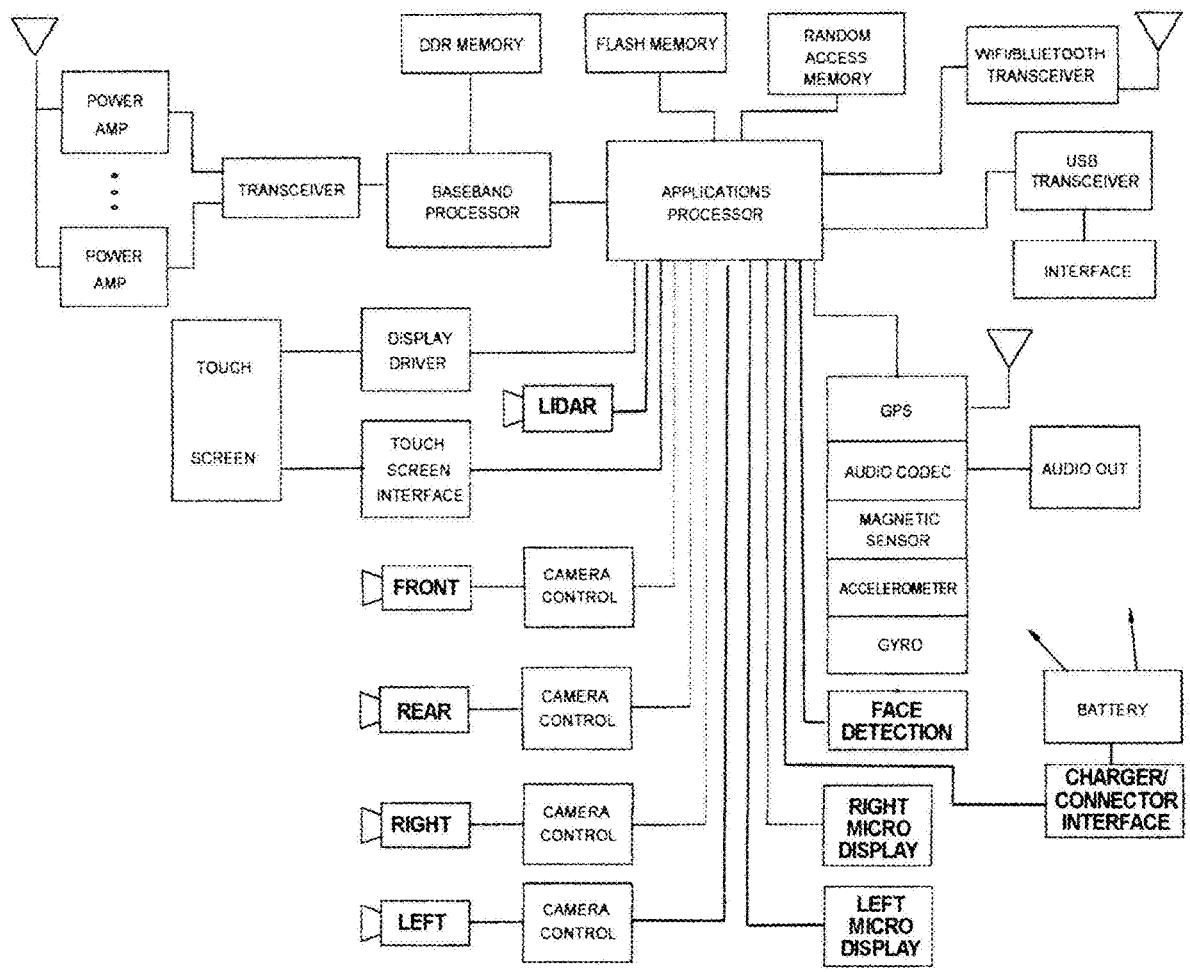
FIG. 6 is a block diagram of an in-phone embodiment of the invention.

FIG. 6 is a block diagram of an in-phone embodiment of the invention. The front and rear cameras and controls each represent the usual one or more still/video cameras now present on the front and back surfaces of smartphones. The right and left cameras and controls, however, as well as the right and left microdisplays represent the image-gathering and image-displaying apparatus that would be added to a conventional smartphone on the opposing side edge surfaces of the device. The face detection block may optionally be added to any embodiment disclosed herein to effectuate an 'instant-on' functionality as described above.

Figure 7:
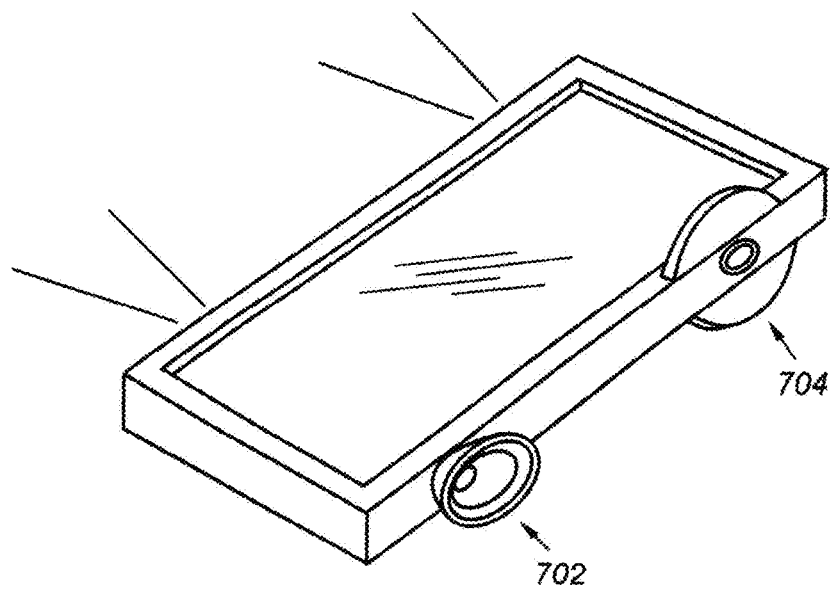
FIG. 7 is a drawing that shows light shields or deployable blinders used to block stray light.

Operations associated with binocular imagery display, manipulation, storage and send/receive would be carried out by the block labeled applications processor, through additional processors may be added for more advance functions. While not evident in FIG. 6, any of the optical path arrangements of FIGS. 3, 4 are applicable to the in-phone embodiments of the invention provided suitable accommodations are made in the body of the smartphone device. In all embodiments monaural or stereo sound may be gathered and or recorded along with the stereoscopic imagery, which would be useful when using the binoculars for bird watching, opera glasses, and other applications. FIG. 7 is a drawing that shows how built-in (702) or manually deployable (704) blinders may be incorporated into the either embodiment of the invention to block stray light.

In all embodiments of the invention, hardware and/or software may be used to ensure that binocular functions are immediately available despite battery usage and privacy issues. For example, one or more sensors may be provided to assume that the device is oriented for binocular use, whereby the right/left image sensors and associated viewfinder displays would be powered up and ready for use. Sensing might include, for example, detection that the device is oriented in a generally horizontal plane with at least one finger touching a binocular-related control or the phone's touch-screen display. Alternatively, an infrared (IR) or other type of proximity sensor may be disposed on the side edge of the housing containing the viewfinders, which would indicate that the device has been positioned adjacent the face of a user.

In terms of privacy, particularly with in-phone embodiments, provision may be made so that others may use the device as binoculars without having access to more personal, phone related functions. For example, an application program or "app" may be provided on the phone to enable use of the device as binoculars—including 'instant-on' capabilities of the type described above—while restricting other uses of the phone, including cellular access, on a selective basis through menus in the app.

In all embodiments, optical, digital or hybrid image stabilization may be used. The differences in the techniques are known to those of skill in the art, and the technologies are evolving rapidly. In the preferred embodiments of this invention, real-time digital or electronic (EIS) image stabilization is used, as EIS is most preferred for motion imagery, and the algorithms are improving dramatically. Optical and digital techniques both typically rely on gyroscopes or accelerometers to detect and measure camera vibrations. In the case of optical stabilization, the measurements (i.e., pan and tilt) are relayed to actuators that move a lens or sensor in the optical chain to compensate for the camera motion. Optical image stabilization is currently preferred for long focal lengths and low light conditions.

EIS uses algorithms to model camera motion, which then are used to correct the images. Pixels outside the border of the visible image are used as a buffer for motion and the information on these pixels can then be used to shift the electronic image from frame to frame, enough to counterbalance the motion and create a stream of stable video. While existing approaches may experience difficulties in distinguishing between moving objects in the field of view and camera vibrations, these and other problems are being solved by adjusting frame buffering intervals and other improvements.

As mentioned, the instant invention may take advantage of image interpolation techniques, particularly if long focal lengths are used and/or until higher resolution image sensors and flat-panel microdisplays are developed. As with motion compensation, the instant invention may use any known or yet-to-be-developed technique for image interpolation, including adaptive and non-adaptive approaches. Adaptive methods change depending on what they are interpolating (sharp edges vs. smooth texture), whereas non-adaptive methods treat all pixels equally. While the invention may be used to gather still stereoscopic images, when used as binoculars, motion interpolation or motion-compensated frame interpolation NCH) may instead be used. In this case intermediate animation frames are generated between existing frames using an appropriate interpolation algorithm to make animation more fluid, to compensate for display motion blur, and synthesize slow-motion effects during replay.

Figure 8A:
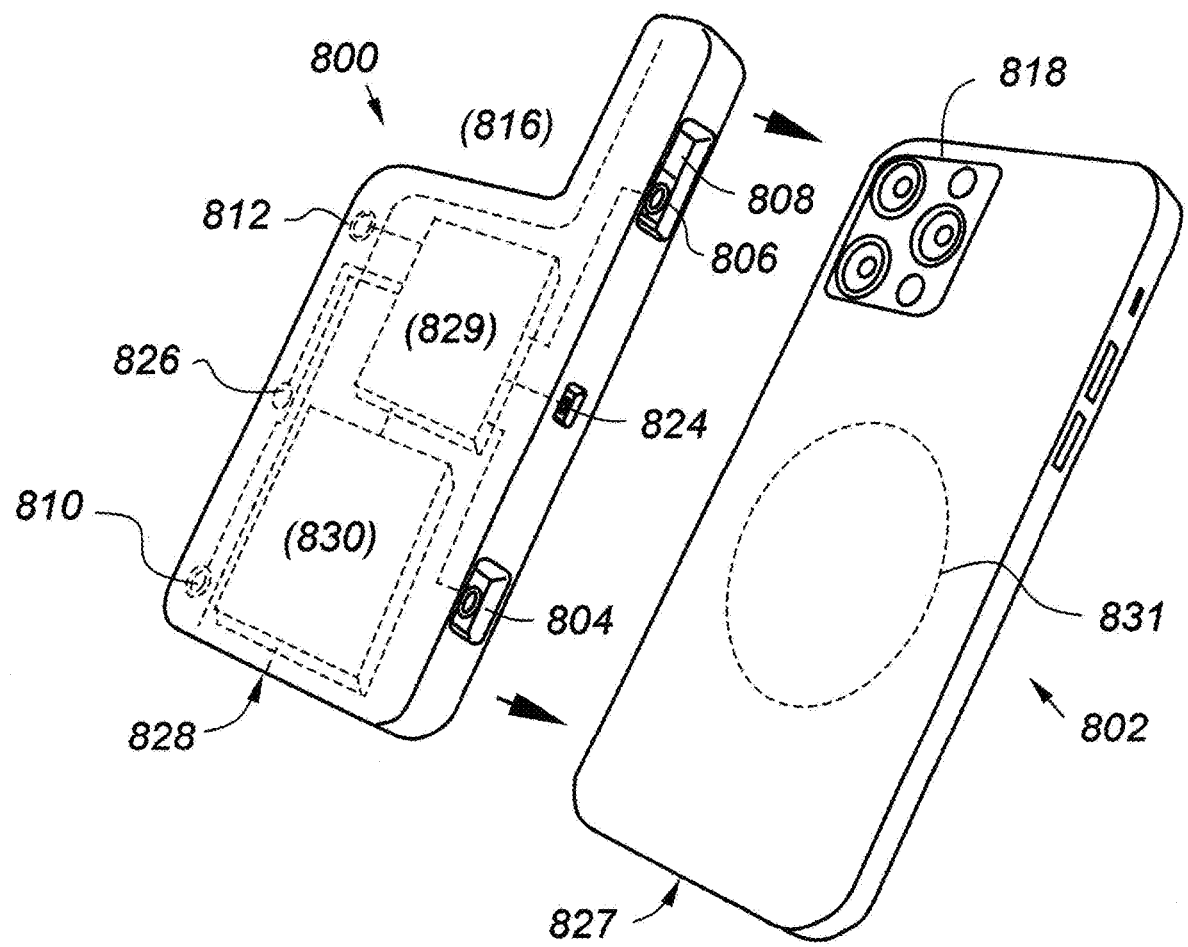
FIG. 8A is a drawing that depicts an embodiment of the invention in the form of a binoculars module adapted for attachment to a smartphone or a case for a smartphone.
Figure 8B:
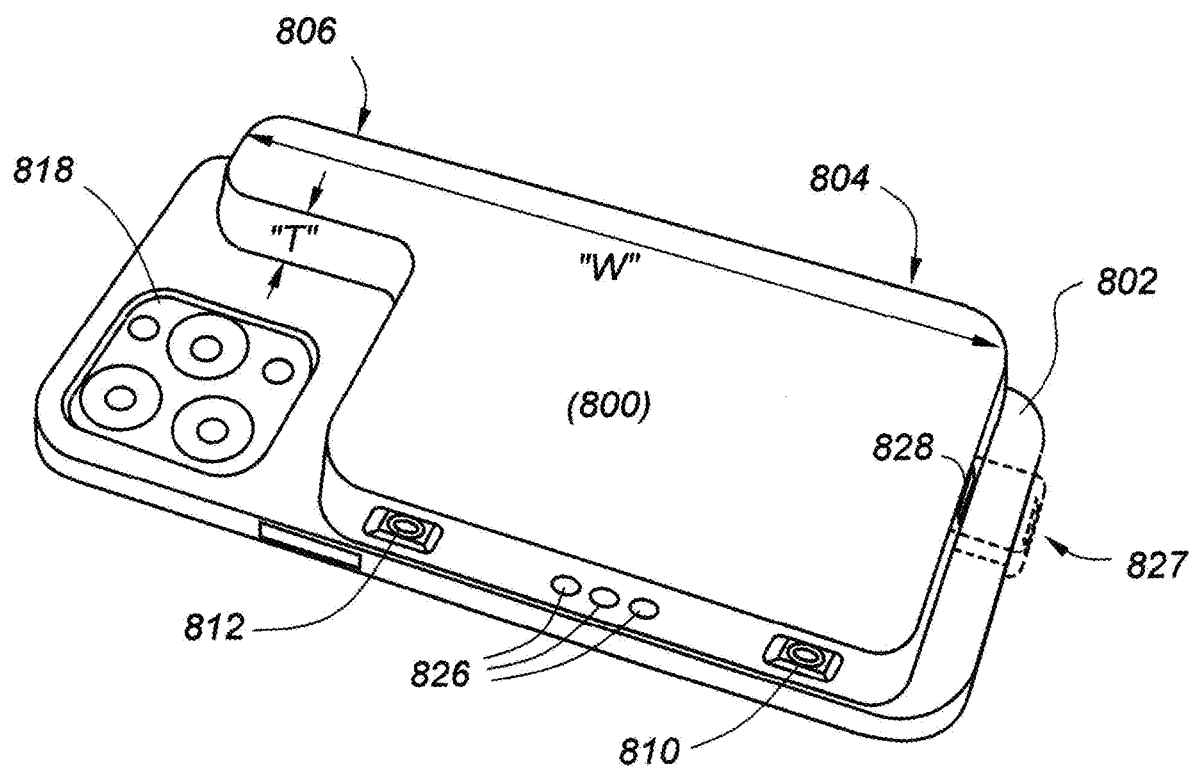
FIG. 8B is a different view of the module of FIG. 8A.

FIG. 8A is a drawing that depicts an "in-module" embodiment of the invention in the form of an electronic binoculars module 800 adapted for attachment to a smartphone or a case for a smartphone. To facilitate such attachment, the module 800 includes a surface, preferably a flat surface configured for contact with the phone or case. Such a surface would preferably be devoid of user controls or interfaces, particularly often-used controls or interfaces. FIG. 8B shows the module 800 attached directly to a phone. Any appropriate temporary or permanent attachment technique may be used, including adhesives, double-sided tapes, thermal welding, magnetic coupling, and so forth. As with the in-phone and in-case embodiments discussed above, the module 800 may also be integrally formed with the smartphone housing or case without the need for separate attachment.

As with the in-case embodiments disclosed herein, module 800 may be entirely self-contained, or may it use any of the capabilities that the smartphone has to offer, including touch screen/user controls; electrical power; and image processing, storage and communications. The module 800 would at least include eyepieces 804 and 806 with any of the interpupillary adjustment technique, including those disclosed herein. The module 800 would also at least include objectives 810, 812 and image sensors. The image sensors are not shown for simplicity, noting that any of the optical arrangements of FIGS. 3A-3D may be used to implement magnification, zoom and focusing.

The module 800 would further include electronics 829 to receive imagery from the sensors and format the imagery to the ocular eyepieces 804, 806 for still, motion/video viewing. Electronics 829 may be taken to include processors of conventional or proprietary design as well as in-module memory for imagery storage/recall and short-/long-range communications including cellular, Bluetooth, WiFi, Zigbee, NFC, etc. to communicate with an attached smartphone and/or cellular communications circuitry separate from that of the phone. Any of the electronic zoom, focus, interpolation or other image processing capabilities disclosed herein may also be implemented in module 800.

If self-contained, module 800 may be detached and used independently as electronic binoculars, optionally using phone capabilities when within range. The non-limiting example of FIG. 8A shows the module 800 being temporarily attached to an iPhone® using a current version of the "MagSafe" magnetic coupling 831 now used for battery packs and wallets. An advantage of the MagSafe attachment mechanism is that it facilitates bidirectional power transfer and signaling capabilities. Such an arrangement may enable the battery in binocular module 800 to charge the phone battery, or vice versa, and the signaling capabilities may enable the binoculars to use at least some of the phone's electronics.

The communication between the module and the smartphone may be based on any appropriate wired or wireless technique, including near-field communications (NFC) provided through the MagSafe interface, for example. While the data rate of NFC is relatively low, it may be used for basic functions such as audio transfer for command recognition, use of the touch-screen display to adjust or store imagery, or launch a higher-bandwidth link such as WiFi for imagery uploading/downloading or more demanding data transfers.

Figure 9A:
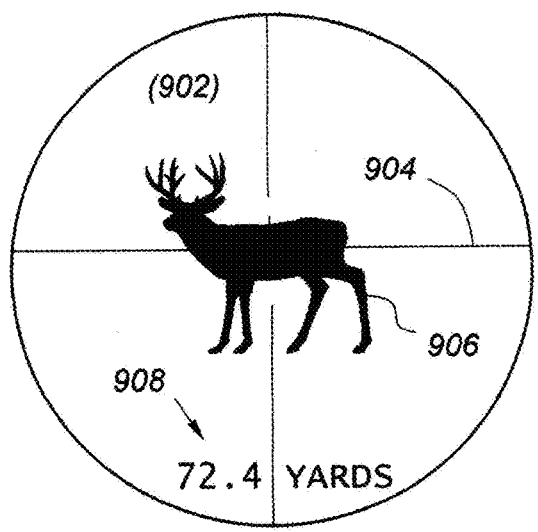
FIG. 9A depicts the use of an alphanumeric or graphical display providing information such as distance to target subject matter.
Figure 9B:
FIG. 9B depicts the use of an alphanumeric or graphical display providing information such as subject matter identification based upon image recognition.

As with other embodiments disclosed herein, module 800 may include a proximity sensor 824 for instant-on communications, and a microphone to receive voice commands or listen to target subject matter. Device 826 may represent a microphone, or may alternatively represent a LIDAR unit to assist with focusing or for use as a range-finder. All embodiments may incorporate a text generator to display information in conjunction with the displayed imagery. As shown in FIG. 9A, for example, LIDAR or other laser-based technology may be used to display a distance value 908 when a crosshair 904 is superimposed over a target 906 in fused binocular display 902. Such a capability may be desirable for hunters and birders (FIG. 9B), as well as in occupations such as surveying. An alphanumeric/graphical display generator may also be used to confirm voice commands and/or operational modes such as recording. As with other embodiments, the image sensors may operate in the infrared for night vision, either automatically based upon ambient light and/or selectable via user control.

In all in-case and in-module embodiments, recognition of the binoculars may automatically launch an application program (app) on the phone to perform additional functions related to the use of the binoculars. Such functions may include establishing an Internet connection to provide a larger voice-command library or image/pattern recognition for subject matter identification. For example, various apps or Internet sites may be used to identify natural phenomena such as animals, birds, plants, trees, stars, constellations; man-made objects such as buildings and monuments; and specific locations based GPS and image recognition. Such information may be displayed in conjunction with target subject matter as shown in FIG. 9.

Figure 10:
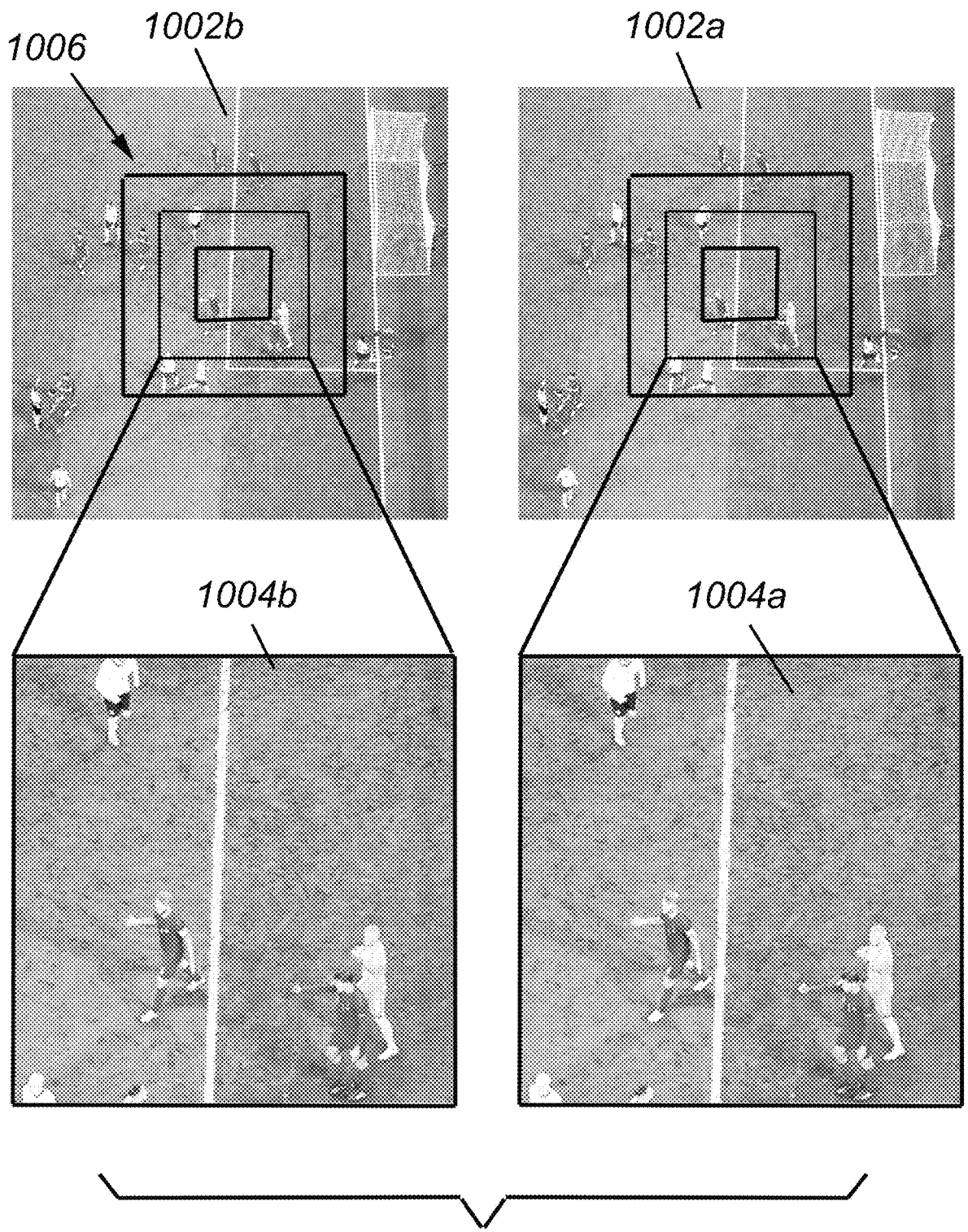
FIG. 10 illustrates digital magnification and zoom possibilities.
Figure 11:
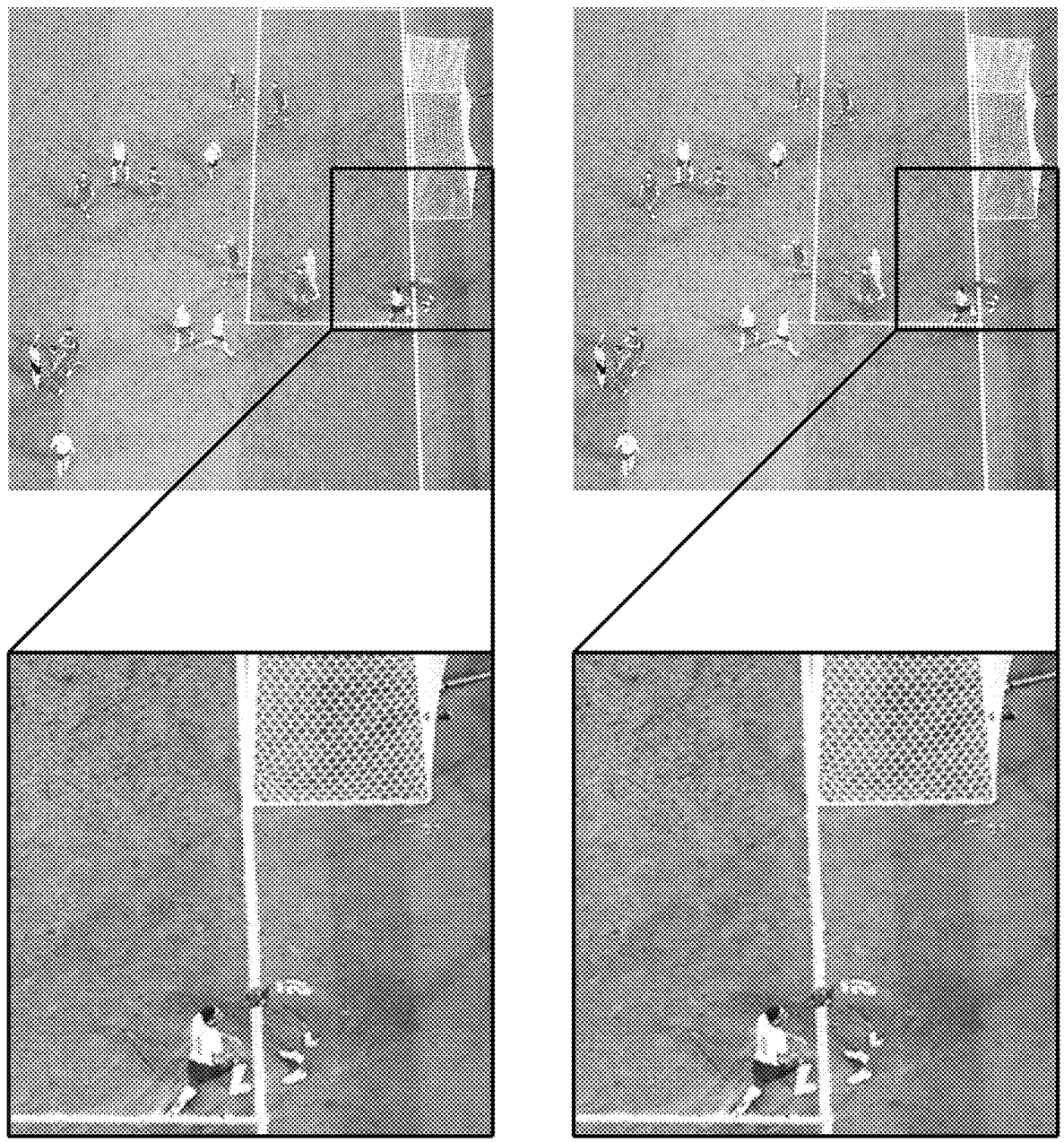
FIG. 11 shows a digital pan operation.
Figure 12:
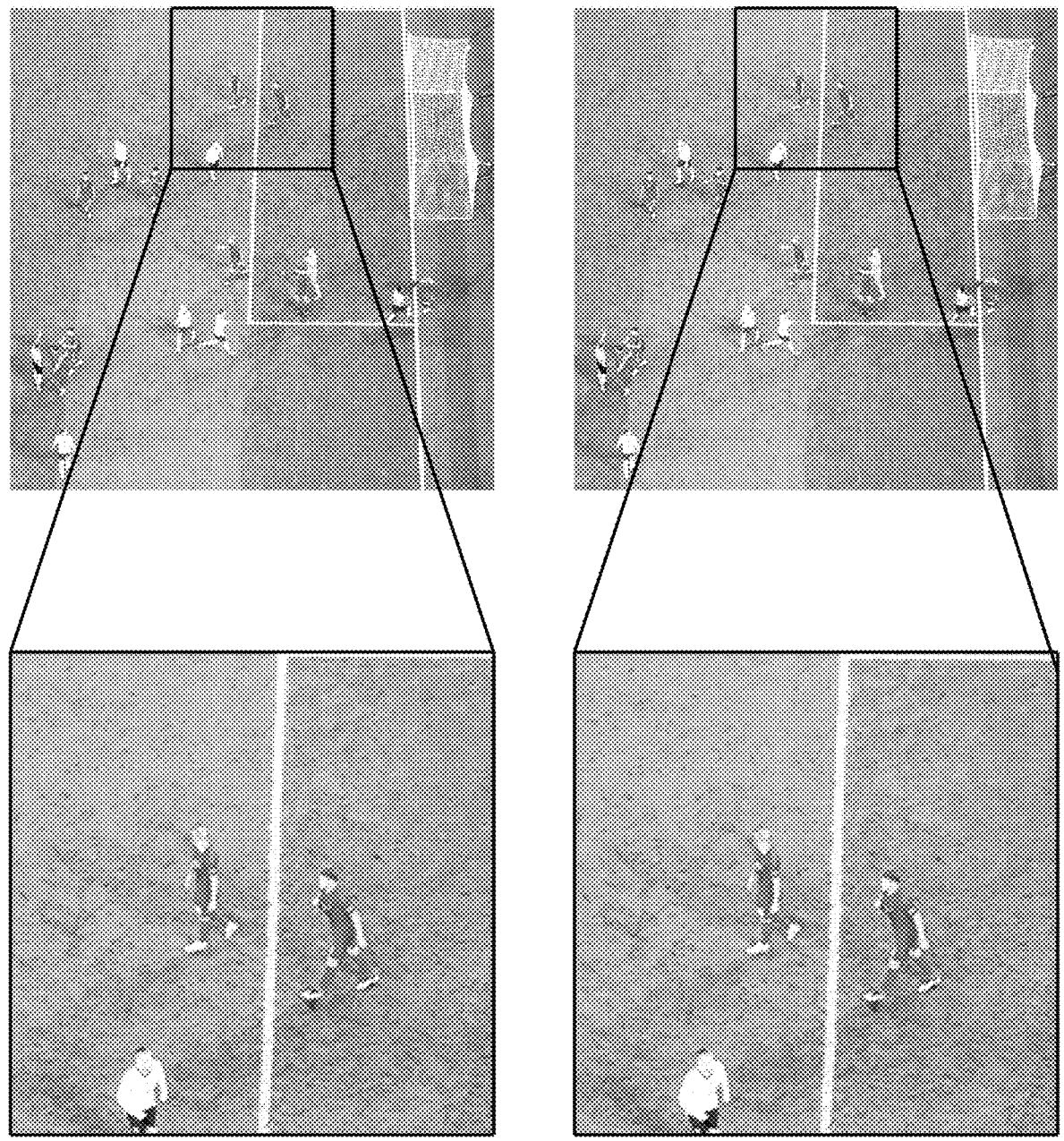
FIG. 12 shows a digital tilt operation.

FIGS. 10-13 illustrate digital image transformations made possible, for example, when the resolution of the image sensors are greater than the resolution of the displays. FIG. 10 shows how selection of a subset of sensor pixels for display implements magnification and zoom functions. In particular, images 1102a and 1102b are gathered by the first and left sensors, respectively. Although the two images may seem identical in reality they are offset slightly to impart depth. The set of rectangles 1106 illustrate one possible range of zoom settings, such that if a zoom setting represented by the middle rectangle is selected, displays 1104a, 1104b exhibit the associated magnification. Although the display 1104a, 1104b are shown separately, the user's vision would fuse them into a unified binocular display. Note further that rectangles need not be shown in the imagery.

Figure 13:
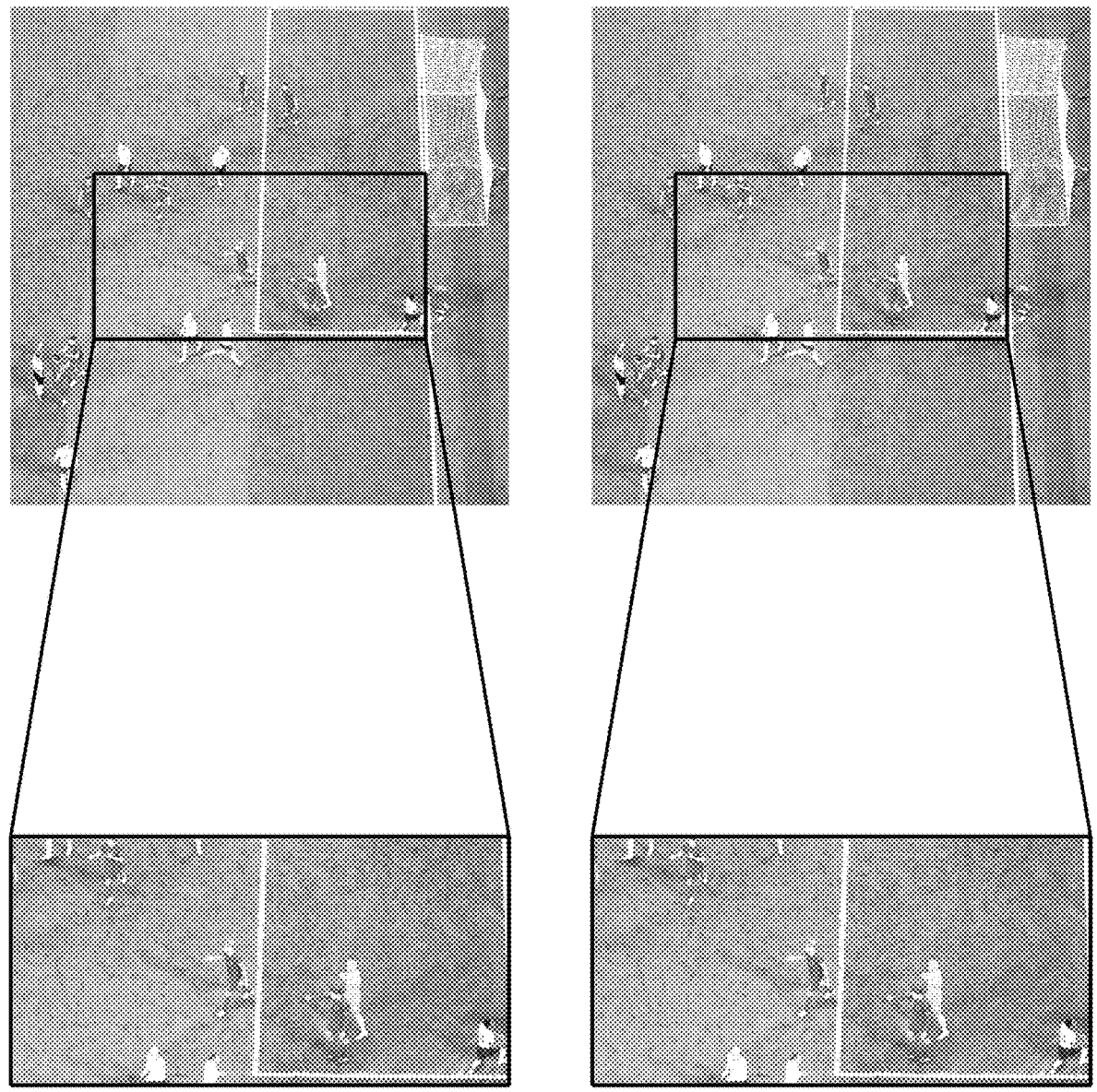
FIG. 13 illustrates a digital change in aspect ratio.

Given a sufficiently large ratio of sensor to display resolution, other functions are possible, including digital panning (FIG. 11); tilting (FIG. 12) and change in aspect ratio (FIG. 13). If purely digital, image transformations such as those depicted in FIG. 10 can be executed without physically moving binoculars according to the invention. For example, a user may select zoom, magnification, or a change in aspect ratio by manipulating a user control (including use of a phone's touch-screen display), or through the use of voice commands (i.e., "ZOOM IN/OUT," "SQUARE," "WIDE SCREEN," "PANORAMA," etc.). While it is less practical to alter pan or tilt with a separate user control or voice commands, since the user would simply pan or tilt the binoculars, the invention also contemplates not only the sharing of real-time binocular imagery with others, but also in certain situations enabling remote users to control binocular functionality.

The sharing of binocular imagery would be made possible if one or more remote users equipped with the inventive binoculars have a wireless connection (i.e., WiFi, Internet, etc.) This would allow one user to share binocular imagery with those other individuals, preferably in real time. For example, one person watching a sporting event could share what they are seeing with others, enabling the others to enjoy a binocular/3D experience, preferably in real time. The connection(s) could also enable audio to be shared at the same time, such that the various users could communicate during the experience. For instance, all users could hear their own cheering, provide information, or ask questions during a game or other event.

Remote users could also ask the primary user gathering or recording the scene to alter image settings (i.e., "Hey, Zoom in!" or "Follow Ronaldo"). There may also be situations wherein a remote viewer could actually change settings at a distance. As one example, if the primary user is looking at a scene with something in it they don't recognize or understand, they could allow a remote user to control the binoculars to provide advice or explain something. The remote user could digitally pan, tilt, or zoom the imagery at their discretion while the binoculars are substantially physical stable. The remote user could also change focus, switch to/from night mode, obtain a distance reading, or alter other settings to get a better idea of what the primary user is viewing. Again, as one example of many, the primary user could ask a remote user to help identify a bird, and the remote user could take control of the binoculars and inform the primary user accordingly.

Returning to FIGS. 8A, B, module 800 would be as compact as technology permits. For example, as shown in FIG. 8B, the thickness "T" of the module may need to be one-inch or greater suing today's sensor/display technologies, though it expected that "T" may soon be ½" or less in a few years. The module also has certain sixe constraints including, for example, "W" which should be at least 2.5", preferably 3" or greater to accommodate typical human interpupillary distances which range from 54-74 mm, with an average of 63 mm. In all embodiments, interpupillary distance adjustment may be manual or automatic (i.e., using the arrangement of FIG. 4C and audible or visible feedback). The same holds true of focusing. While auto-focus is preferred for most applications, this does not preclude the use of manual focus using adjustable rings or sliders for focus or diopter adjustment for either or both eyes.

The module may assume any peripheral shape so long as desired phone features are preserved. For example, module 800 may include a notched region 816 to ensure that phone cameras or other features 818 are not compromised. The module 800 may further include optional folding flaps (not shown) to protect the optical components and to act as light shields during binocular use. That is, when folded own, the eyepieces and imagery gathering devices would be covered, but when folded up the flaps would act to minimize stray light.

As further illustrated in FIG. 8B, module 800 may include a connector or port 828 to receive power to charge battery 830. This may require two charging cables, one for the module and one for the battery. As an alternative, an extension piece that overlaps with an edge of the smartphone may be used, providing a single port 827 for charging both batteries (and/or for hardwired data transfers).

The invention disclosed herein may also take further advantage of the technology described in U.S. Pat. No. 9,661,232, entitled "Apparatus and method providing auto zoom in response to relative movement of target subject matter," incorporated herein by reference in its entirety. Teleology described in the '232 Patent provides apparatus and methods for automatically zooming out imagery if relative movement is detected between target subject matter and the binoculars, and automatically zooming in the imagery if the relative movement of the target subject matter slows down or becomes stationary. As with the other embodiments disclosed herein, a powered zoom lens may effectuate the automatic zooming, or the zooming may be accomplished digitally without moving parts.

The invention claimed is:

1. Electronic binoculars, comprising:
a module including an outer surface, an inner surface and an outer edge defining a periphery including a first outer surface facing in a first direction and a second outer surface facing in a second direction opposite to the first direction;
wherein the inner surface of the module is configured for temporary or permanent attachment to an existing smartphone or a case for an existing smartphone;
a pair of spaced-apart right and left imagery-gathering devices disposed on the first outer surface of the module;
right and left image sensors disposed in the module to convert the imagery gathered by the right and left image-gathering devices into electrical signals representative of the right and left imagery;
a pair of spaced-apart, physically separated right and left image-displaying devices disposed on the second outer surface of the module;
electronic circuitry disposed within the module and in electrical communication with the right and left image sensors and the right and left image-displaying devices, the electronic circuitry being operative to receive the electrical signals from the right and left image sensors and simultaneously display the imagery gathered by the right and left image-gathering devices on the right and left image-displaying devices, respectively.

2. The electronic binoculars of claim 1, wherein the imagery gathered and displayed is real-time motion imagery.

3. The electronic binoculars of claim 1, further including a wired or wireless interface to a smartphone including a touch-screen display, and wherein the electronic circuitry enables a user to adjust one or more operational functions of the electronic binoculars using the touch-screen display of the smartphone.

4. The electronic binoculars of claim 1, further including an auto focusing of the imagery.

5. The electronic binoculars of claim 1, further including apparatus for performing a digital or optical zooming of the imagery.

6. The electronic binoculars of claim 1, including a temporary magnetic attachment of the module to a smartphone.

7. The electronic binoculars of claim 6, wherein the attachment includes one- or two-way electrical power transfer enabling the smartphone to charge a battery in the module, or enabling the battery in the module to charge a battery in the smartphone.

8. The electronic binoculars of claim 6, wherein the attachment includes a wired or wireless interface enabling the transfer of information between the module and the smartphone.

9. The electronic binoculars of claim 6, wherein the attachment includes a wireless interface based upon electromagnetic or magnetic near-field communications (NFC).

10. The electronic binoculars of claim 1, wherein the attachment of the module to the smartphone automatically launches an application program (app) on the smartphone to assist a user in operating the electronic binoculars.

11. The electronic binoculars of claim 1, wherein the attachment of the module to the smartphone automatically establishes an Internet communication to assist a user in operating the electronic binoculars.

12. The electronic binoculars of claim 1, further including a wired or wireless electronic interface enabling the electronic circuitry of the module to communicate with the smartphone and utilize the processor, memory or wireless communications capabilities of the smartphone to manipulate, store or transmit the imagery, or receive imagery from an external source for display on the right and left image-displaying devices.

13. The electronic binoculars of claim 1, further including apparatus for adjusting interpupillary distance.

14. The electronic binoculars of claim 1, further including apparatus for determining when the binoculars are oriented for use to provide an instant-on function.

15. The electronic binoculars of claim 1, wherein the electronic circuitry in the module or an attached smartphone provides one or more of the following functions with respect to the imagery:
stabilization,
interpolation, and
auto-focusing.

16. The electronic binoculars of claim 1, further including LIDAR operative to determine the distance to subject matter in the imagery or assist with focusing the imagery.

17. The electronic binoculars of claim 1, wherein the image sensors operate in the infrared (IR) portion of the electromagnetic spectrum enabling the binoculars to perform a night vision function.

18. The electronic binoculars of claim 1, wherein:
the right and left image-displaying devices include microdisplays with diagonal measurements of 0.5 inches or less; and
one or more optical components to magnify the microdisplays.

19. The electronic binoculars of claim 1, wherein:
the right and left image sensors are separate solid-state devices; or
the right and left image sensors use different regions of the same solid-state image sensor.

* * * * *